United States Patent [19]
Nelson

[11] 4,093,303
[45] June 6, 1978

[54] WHEELCHAIR RETAINING APPARATUS FOR VEHICLES

[75] Inventor: Eldrid W. Nelson, Minneapolis, Minn.

[73] Assignee: Chas. Olson & Sons and Wheel Service Co., Inc., St. Paul, Minn.

[21] Appl. No.: 772,457

[22] Filed: Feb. 28, 1977

[51] Int. Cl.$^2$ .......................... B60N 1/02; B60P 7/08; B61D 45/00; B62B 11/00

[52] U.S. Cl. .......................... 296/65 R; 105/368 T; 105/465; 105/494; 105/502; 224/42.4; 248/505; 254/77; 280/179 R; 296/19

[58] Field of Search .............. 70/234, 235; 105/368 T, 105/464, 465, 473, 477, 482, 494, 495, 496, 502, 503; 211/5, 7; 214/38 A, 38 BB; 224/40.03 B, 42.4, 42.5 R, 42.5 A, 42.5 B; 248/119 R, 500, 503, 505, 507; 280/179 R, 242 WC; 296/19, 20, 65 R; 403/59, 107, 108, 109; 254/77

[56] References Cited

U.S. PATENT DOCUMENTS

| | | | |
|---|---|---|---|
| 982,997 | 1/1911 | Russell | 296/19 |
| 1,716,316 | 6/1929 | Lanning | 296/65 R |
| 1,835,840 | 12/1931 | Barclay | 296/65 R |
| 2,101,210 | 12/1937 | Barclay | 296/65 R |
| 2,202,837 | 6/1940 | Cox | 296/19 |
| 3,955,847 | 5/1976 | Schiowitz | 105/464 X |
| 3,984,118 | 10/1976 | Wilson | 105/502 |

FOREIGN PATENT DOCUMENTS

| | | | |
|---|---|---|---|
| 368,528 | 3/1932 | United Kingdom | 296/19 |

*Primary Examiner*—Drayton E. Hoffman
*Assistant Examiner*—Howard Beltran
*Attorney, Agent, or Firm*—H. Dale Palmatier

[57] ABSTRACT

Apparatus retaining wheelchairs in stationary position in a bus type motor vehicle including retaining arms extending along and around the wheelchair wheels and gripping the wheelchair frame at the front, the arms being extendible and retractable, and a releasable chair clamping jaw, and being swingable upwardly to an out of the way position, the arm being articulated to swing the jaw transversely toward and away from the chair, the articulation in the arm providing locking for the extension and retraction of the arm, slide rails securing the retaining arms to the vehicle frame, the slide rails being wall mounted or floor mounted.

26 Claims, 18 Drawing Figures

FIG. 3
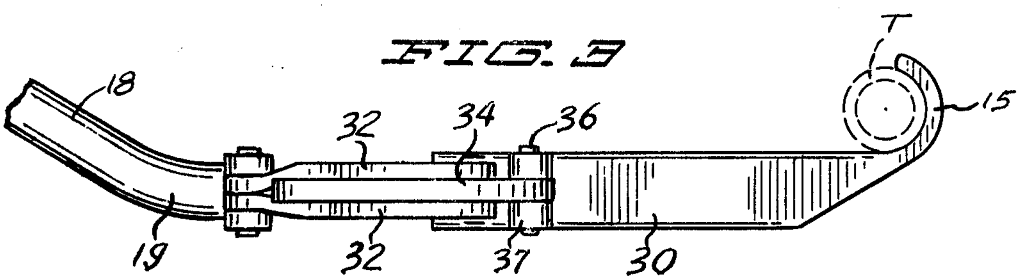
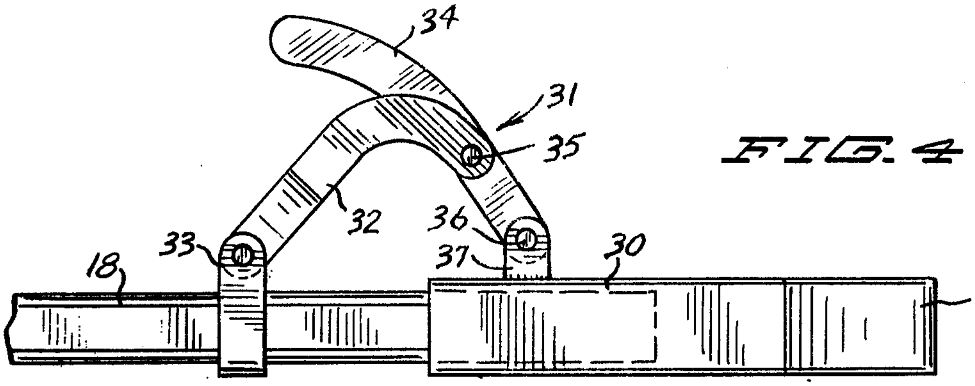
FIG. 4
FIG. 5
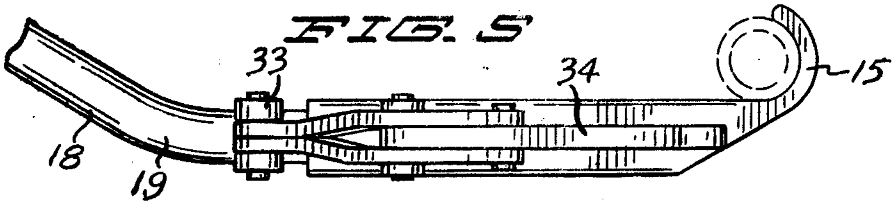
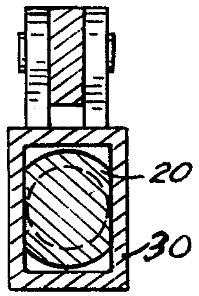
FIG. 6a
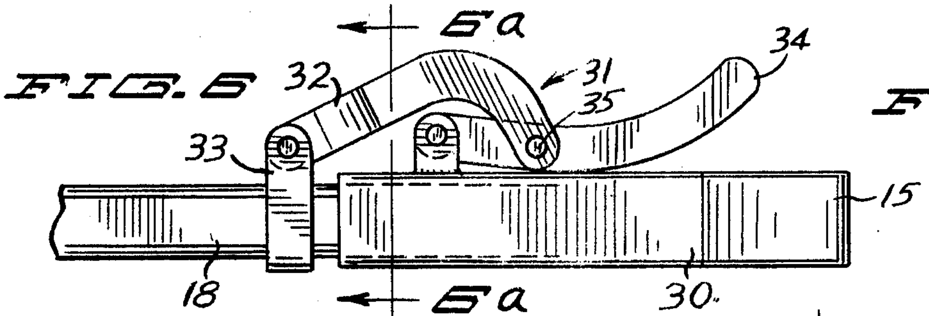
FIG. 6
FIG. 7
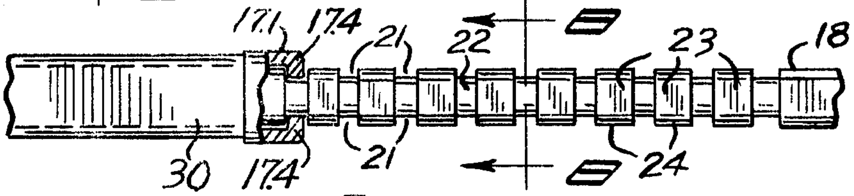
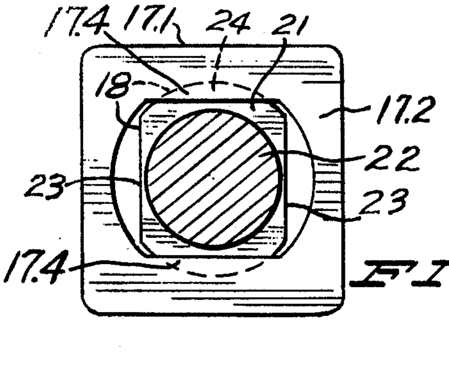
FIG. 8
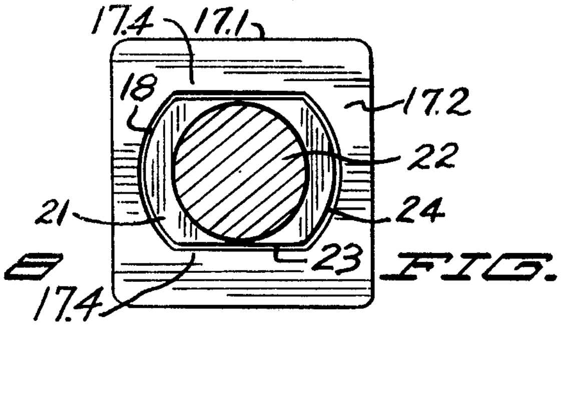
FIG. 9

WHEELCHAIR RETAINING APPARATUS FOR VEHICLES

This invention relates to apparatus for immobilizing wheelchairs as they may be used for carrying persons in vehicles.

BACKGROUND OF THE INVENTION

People who are confined to wheelchairs encounter a great deal of difficulty in traveling in vehicles such as buses because there have not been any good devices available for immobilizing the wheelchairs while in the vehicles.

There have been a few devices available commercially which are to be affixed to the sidewall of a bus body and then simply attached to the wheelchair by means of a hook attached to the rim of the main wheel of the wheelchair. These hooks have been inadequate for the purpose intended because they do not solidly secure the wheelchair in place while in the vehicle, and damage to the rims of the wheels is likely to occur in the event of any sudden stops or starts of the vehicle while the wheelchair is contained therein. Furthermore, such devices have not been sufficiently flexible as to accommodate a wide variety of wheelchairs which currently exist.

SUMMARY OF THE INVENTION

The present invention makes it possible to anchor a wheelchair in a bus body so that the wheelchair is very firmly secured. The device is sufficiently flexible as to permit one or a number of wheelchairs to be accommodated simultaneously and in very close proximity to each other.

The wheelchair is grasped by its frame and held solidly against the structure of the bus body so that the entire wheelchair and the patient carried therein is completely immobile relative to the body of the bus.

The retaining apparatus for the wheelchair is readily applicable and removable relative to the bus body so that particular spaces in the bus can be quickly converted for use in carrying a wheelchair and for other uses as may be desired.

The present invention will accommodate most of the common types and sizes of wheelchairs which vary considerably in width and in length from front to back.

According to the present invention, the rubber tire of the main wheel of the wheelchair is held firmly against a fixed part of the bus frame or body, and the resiliency of the rubber tire is utilized in assuring that the entire wheelchair is very firmly, but readily releasably attached to the vehicle or bus body.

In adjusting the clamping apparatus to fit a wheelchair of particular size, no tools need be utilized, and the entire adjustment procedure can be accomplished very quickly and in many cases by the person in the chair if he has some degree of dexterity in his limbs. In most cases, however, an attendant, such as the bus driver, can set up a wheelchair to be held in stationary position with a minimum of difficulty.

The wheelchair clamping and retaining apparatus includes a stationary rail affixed to and extending horizontally at a location spaced above the floor, approximately half the height of the large main wheels of the wheelchair. This bar provides a mounting for the clamping devices and also accommodates the wheels of the wheelchair to bear against it. The clamping devices are disposed at each side of the wheelchair and are slidably adjusted along the rail so as to be in close proximity with the outer sides of the wheelchair wheels. The clamping devices normally extend forwardly along the wheelchair frame and clamp to a forward upright portion of the wheelchair frame. The clamping device is adjustable in length and has a linkage to move the clamping jaw rearwardly against the wheelchair frame and pull the frame and wheels tightly against the stationary rail.

In many instances the retaining apparatus is mounted against the wall of the bus, and to accommodate such usage, the clamping devices may swing upwardly and out of the way when not in use.

The present invention also contemplates mounting the stationary rail at a central location in an open bus body or van-type vehicle. The present invention facilitates mounting the stationary bar to anchoring tracks in the floor of the bus body. Provision is made for readily and easily moving the stationary bar from the floor mounted tracks so that the open center space of the bus body or van may be used for many purposes, not the least of which is maneuvering other wheelchairs in the bus body and subsequently locating additional wheelchairs and anchoring them in a central location in the bus body.

BRIEF DESCRIPTION OF THE DRAWINGS

FIG. 3 is an enlarged detail top plan view of the clamping jaw of the retaining device.

FIG. 4 is an enlarged elevation view of the jaw mechanism illustrated in FIG. 3.

FIG. 5 is a detailed top plan view, similar to FIG. 3, but illustrating a shifted position of the mechanism.

FIG. 6 is an elevation view of the mechanism of FIG. 4, but illustrating a shifted position of the mechanism.

FIG. *6a* is an enlarged detail elevational sectional view of the shifting and locking mechanism taken at approximately *6a—6a* in FIG. 6.

FIG. 7 is an enlarged detail elevation view of a part of the clamping apparatus and partly broken away for clarity of detail.

FIG. 8 is an enlarged detail section view taken at approximately 8—8 in FIG. 7.

FIG. 9 is an enlarged detail section view, similar to FIG. 8, but showing a shifted position of the mechanism.

Figure 10:
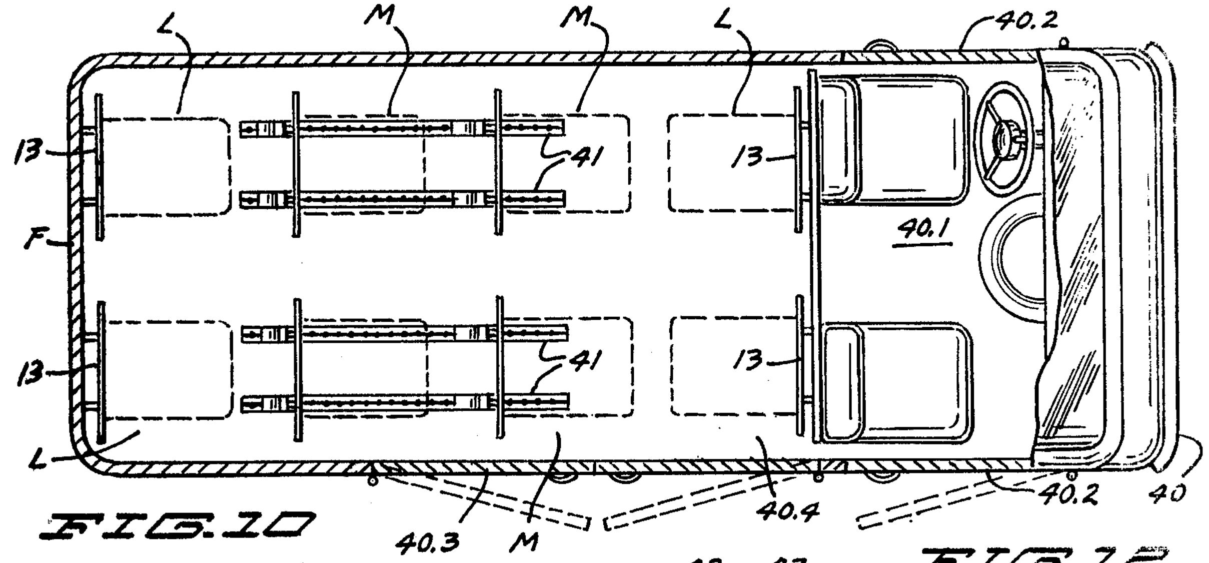

FIG. 10 is a diagrammatic plan view of a van-type bus with the top broken away to show a possible arrangement of wheelchairs affixed therein.

Figure 11:
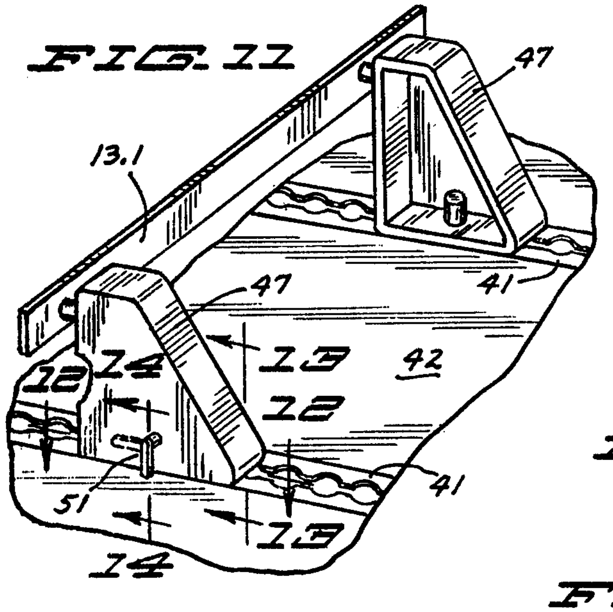

FIG. 11 is a perspective view of an anchor rail removably affixed to the floor of the bus body.

Figure 12:
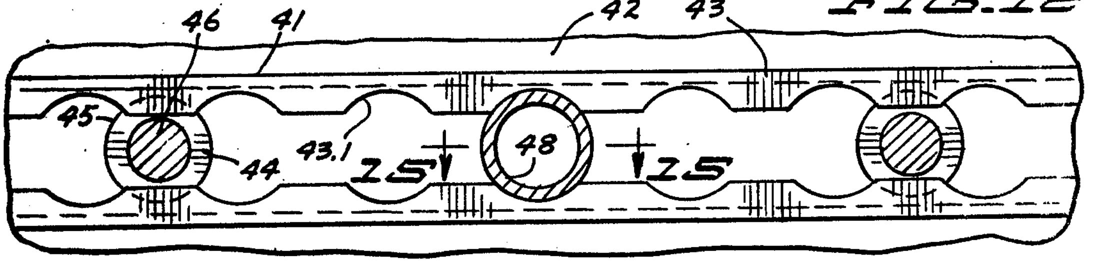

FIG. 12 is a detail section view taken at approximately 12—12 in FIG. 11.

Figure 13:
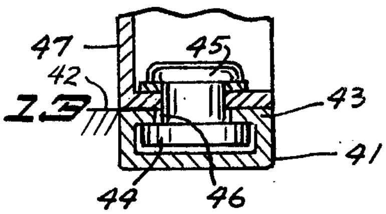

FIG. 13 is an enlarged detail section view taken at approximately 13—13 in FIGS. 11 and 12.

Figure 15:
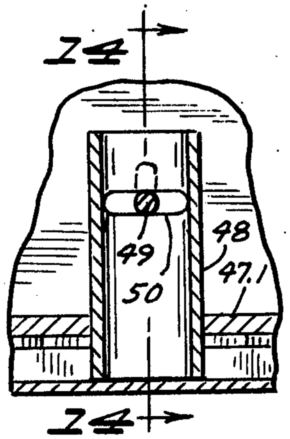
Figure 14:
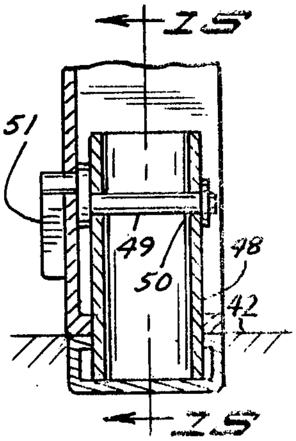

FIG. 14 is a detail section view taken approximately at 14—14 in FIGS. 11 and 15.

FIG. 15 is a detail section view taken approximately at 15—15 in FIGS. 12 and 14.

Figure 16:
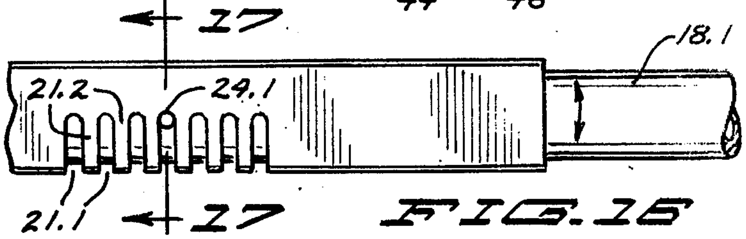

FIG. 16 is an elevation view of a modified form of telescoping lock in the arms.

Figure 17:
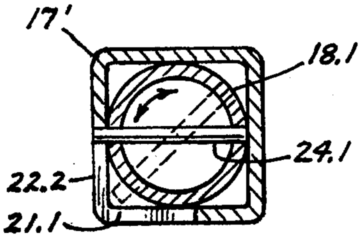

FIG. 17 is a detail section view taken approximately at 17—17 in FIG. 16.

DETAILED DESCRIPTION OF THE INVENTION

Figure 1:
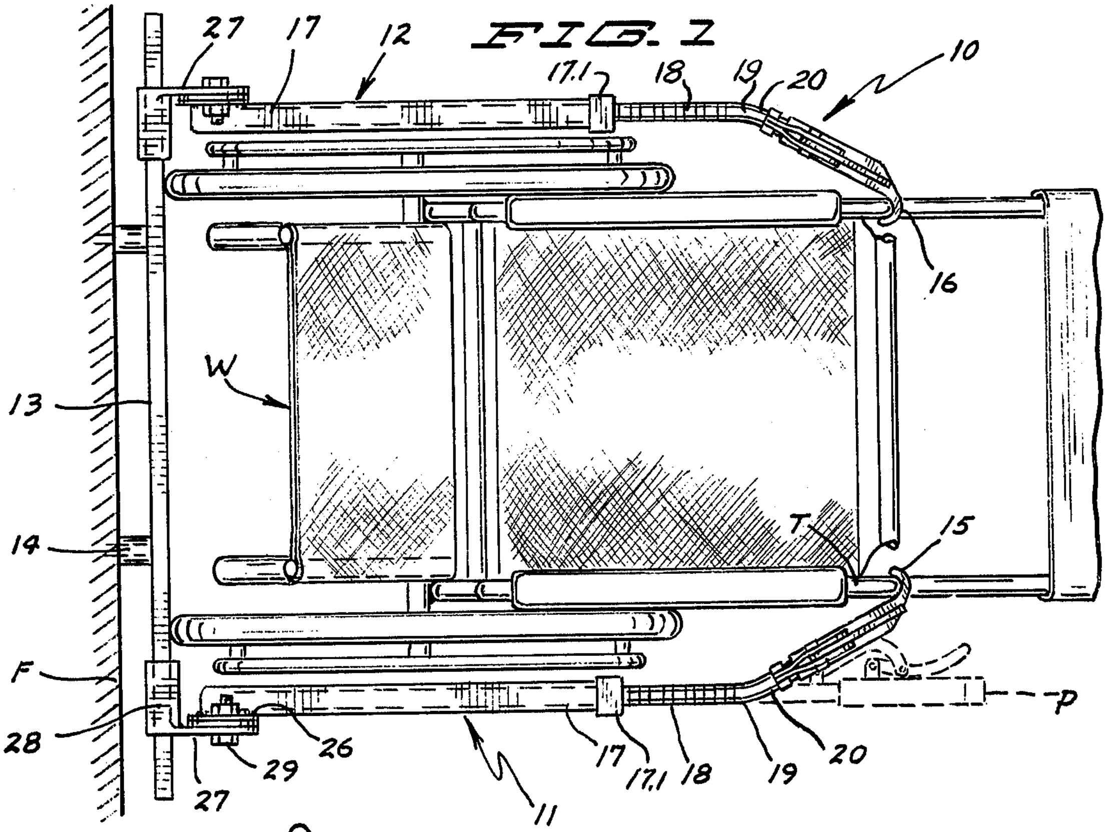
FIG. 1 is a top plan view of the present invention clamping a wheelchair in fixed position.

The wheelchair retaining device is illustrated in the drawings and described herein and is indicated in general in FIG. 1 by the numeral 10. The wheelchair retaining device includes a pair of arms, indicated in general by numerals 11 and 12 to extend horizontally on opposite sides of a wheelchair W and to extend substantially horizontally from front to back of the wheelchair. The arms are mounted on a stationary rail 13 affixed as by suitable fittings 14 to a stationary frame part F of a passenger type vehicle. The frame part may be one and the same as the wall of the vehicle, or may be other type of frame structure such as channels, beams etc.

The arms 11 and 12 have clamping jaws 15 and 16 on their front ends to embrace the tubular frame T of the wheelchair W.

It will be seen that the forward ends of arms 11 and 12. are bent obliquely inwardly with respect to each other adjacent their front ends so that the arms may lie alongside the rubber tired wheels of the wheelchair while the clamping jaws 15 are disposed well inwardly to embrace the frame structure T of the wheelchair. The arms 11 and 12 are articulated to permit outward movement of the clamping jaws 15 and 16 by swinging or tilting into the dotted line position P illustrated in FIG. 1 so that the arms will not interfere with the wheelchair as the chair is removed in a forward direction from that illustrated in the drawing. This swinging or tilting of the jaws 15 and 16 is also important for proper detachment of these jaws from the frame because oftentimes close quarters are encountered relative to other wheelchairs and clamping devices 10 in a passenger type bus or vehicle.

The two arms 11 and 12 are substantially identical to each other so that an understanding of one of the arms will suffice for an understanding of both. As illustrated, each of the arms is arranged to be extensible and retractable, and, accordingly, has a substantially square tubular sleeve 17 and a slightly smaller rod type insert 18 telescopically inserted into the sleeve 17. The rod insert 18 is bent at 19 so as to orient the front portion 20 thereof in an inwardly and oblique arrangement. The rod type insert 18 is rotatable in the sleeve 17 to provide the necessary articulation to move the jaw on the front end of the arm outwardly away from the wheelchair to the position P illustrated in FIG. 1.

Locking apparatus is provided in each of the arms to permit and prevent extension and retraction of the arm. As illustrated in FIGS. 7 - 9, the sleeve 17 is provided with an enlarged sleeve housing 17.1 at its forward end. The sleeve housing 17.1 has an end plate 17.2 with an oblong opening 17.3 therein conforming to the oblong transverse shape of rod 18 and slidably receiving the rod therein. The end plate 17.2 defines rod locking keys 17.4 adjacent the upper and lower edges of the opening 17.3. Keys 17.4 are integral of plate 17.2, but could take the form of pins, as well, traversing the end of tube 30.

The rod 18 of extruded aluminum has a number of notches 21 formed in the upper and lower sides thereof to define a reduced core 22 along a length thereof which is circular in cross section, and of such a diameter as to readily pass through the opening 17.3 and between the keys 17.4 in the sleeve housing. The rod insert 18 has opposite flat sides 23 which are spaced apart a distance substantially identical to the diameter of the core 22 so as to readily pass between the keys 17.4. The rod insert 18 also has a plurality of regularly spaced lugs 24 projecting transversely outwardly from the core 22 to confront and engage the keys 17.4 of the end plate 17.2 when the rod insert 18 is rotated about an axis extending longitudinally of the sleeve 17 through 90° or approximately one-fourth of a revolution.

Figure 2:
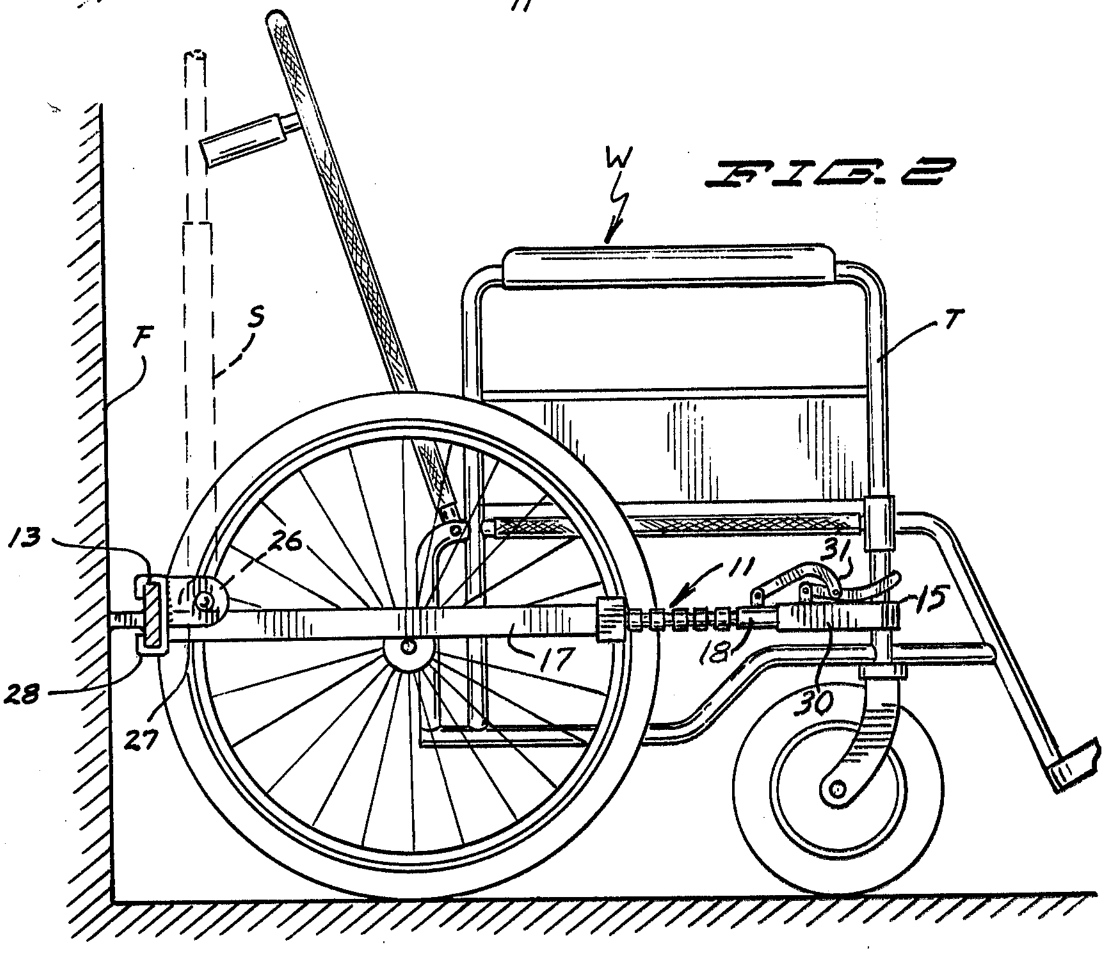
FIG. 2 is an elevation view of the clamping device and wheelchair fixed in position.

Accordingly, it will be seen that when the rod insert 18 is rotated to the position illustrated in FIG. 8, which is the same identical position as the rod insert illustrated in FIGS. 1 and 2 wherein the clamping jaw embraces the frame of the wheelchair, the lugs 24 will engage the end plate 17.1 and no further changes in the length of the arm can occur. After the clamping jaw is released from the wheelchair frame, the front portion 20 of the rod insert can be swung downwardly to the dotted position P illustrated in FIG. 1, or upwardly, to remove the clamping jaw from the vicinity of the wheelchair frame and to also orient the rod insert 18 to the position illustrated in FIG. 9 to permit sliding of the rod insert 18 relative to the sleeve 17.

At the rear end of the arms 11 and 12 each of the sleeves 17 has a mounting ear 26 welded thereto and confronting a mounting ear 27 which is welded to a C-shaped slide 28 embracing the rectangularly shaped rail 13. The slide 28 fits snugly to the shape of the rail, but moves freely therealong. A pivot bolt 29 extends through aligned apertures in the ears 26 and 27 to provide a hinged connection between the sleeve 17 and the slide 28 to accommodate upward swinging of the sleeve 17 so that the entire arm can be swung to an upright out of the way position indicated by the letter S in FIG. 2. It will be noted that the rail 13 has open and unobstructed ends and the slides 28 may be entirely removed from the rail 13 by simply sliding them off the end.

As illustrated in FIGS. 3 - 6, the forward end 20 of the rod 18 has the same characteristic oblong transverse shape.

The clamping jaws 15 and 16 have tubular mounting portions 30, substantially square in cross section and preferably formed of box channel and slidably mounted on the front end 20. The clamping jaws are thereby mounted for fore and aft movement along the arms.

It will be noted that each of the clamping jaws 15 and 16 is substantially hook shaped, and is arcuately shaped about an upright axis so that the jaw lies substantially horizontal and embraces an upright part of the wheelchair frame T. A swinging linkage, indicated in general by numeral 31, is provided for controlling the fore and aft sliding movement of the tubular mounting 30 and for locking the tubular mounting and clamping jaw in retracted position. The linkage 31 includes a pair of hook shaped links 32 pivoted on a pair of upstanding ears 33 affixed as by welding to the rod 18. The forward ends of links 32 are pivoted to the handle 34 at pin 35. Handle 34 is mounted on pin 36 in upstanding ears 37 which are affixed as by welding to the sleeve or box channel 30.

As the handle 31 is swung to the position of FIG. 6, the mounting 30 and the clamping jaw 15 are moved rearwardly along the arm and bear very firmly against the wheelchair. As this clamping of the chair occurs, the pivot point defined by pin 35 swings clockwise about the pin 36 to an over-center position as illustrated in FIG. 6 so that the pressure exerted by the wheelchair against the clamping jaw tends to hold the rod 32 and the linkage arm 35 downwardly so that the clamping jaw is effectively locked in retracted position.

FIG. 10 illustrates a possible arrangement of arranging a member of wheelchairs in clamped position in a small open bus or van type vehicle which is indicated in general by numeral 40. The vehicle has a driver's compartment 40.1 with access doors 40.2, and rear access door 40.3 for the open van compartment 40.4. Rails 13 as illustrated in FIGS. 1 and 2 are shown to be affixed to upright walls or bulkheads F which incorporate suitable frame structure as to render the mounting of the rails 13 to be solid. Accordingly, the retaining arms 11 and 12 may be suitably mounted on the several rails 13 to affix wheelchairs in a number of parking locations indicated by the letter L and illustrated in dotted line.

Affixing of additional wheelchairs in positions indicated by dotted lines and numerals M, approximately in the center of the compartment 40 of the vehicle, may be provided for by tracks 41 which are affixed to and embedded in the floor of the compartment 40.4 in order to lie flush with the floor 42. The tracks 41 are generally similar to the type that are oftentimes used in the floor structures of aircraft which may be alternately employed for mounting passenger seats or tying down cargo. The tracks 41, as illustrated, are channel shaped and have inturned flanges 43, the upper surfaces of which lie substantially flush with the adjacent floor surface 42. The flanges 43 have regularly spaced recesses 43.1 therein, circularly arcuate in shape to receive the circular heads 44 of attachment lugs 45, the reduced circular narrow necks 46 thereof are of such a diameter as to pass between the edges of the track flanges 43. The upper ends of the mounting lugs 45 are affixed into the bottom of upright bases or pedestals 47 to which rigid rails 13.1 are affixed for mounting the wheelchair retaining arms 11 and 12. In the position of the lugs 45 illustrated in FIGS. 12 and 13, the larger circular heads 44 thereof bear upwardly against the track flanges 43 to solidly retain the pedestals 47 in fixed position relative to the floor 42. In order to prevent the pedestals 47 from shifting longitudinally of the tracks, a retractable sleeve or cylinder 48 is mounted in the bottom wall 47.1 of the pedestal and extends downwardly through one of the arcuate recesses 43.1 in the top flange; and accordingly the pedestal 47 is prevented from shifting along the track and the retaining lugs 45 are maintained in the proper relationship to the track for holding the pedestals solidly to the floor. A lifting crank 49 extending through slots 50 in opposite sides of the cylinder 48 and controlled by a rotary handle 51 are provided to raise and lower the cylinder 48 as it may be desired to remove or replace the pedestals and rail 13.1 in the bus.

In FIGS. 16 and 17, an alternate locking apparatus is illustrated to accommodate tilting of the front ends of the arms 11 and 12 while permitting longitudinal extension and retraction of the arms. The insert 18.1 has a transverse pin or lug 24.1 which protrudes to the exterior of the insert at one side and extends into one of a plurality of slots 21.1 of the sleeve portion 17'. The portions 21.2 of the sleeve between the slots acts as a stop against which the pin 24.1 bears to prevent extension and retraction of the arm.

It will be seen that I have provided a new and improved wheelchair retaining device for a passenger type vehicle so that the device may be readily and easily applied to the vehicle and removed so that wheelchairs can be positioned in various locations in the body of the vehicle. The clamping jaws clamp to the upright frame structure at the front of the wheelchair and pull the wheelchair tightly against the rail to which the mounting arms are attached. The arms of the structure are adjustable as to length and are adjustable in a sideward direction to accommodate many different sizes of chairs. The clamping jaws may be tilted or swung out of the way and may be swung inwardly toward the wheelchair so that they may be readily and easily applied to and removed from the wheelchair frame.

What is claimed is:

1. A wheelchair retaining device for use in a passenger carrying vehicle, comprising:
   - an elongate arm to extend generally horizontally alongside of the wheelchair from back to front, the arm having a rear end with attachment means to be affixed to a rigid part of the vehicle, the arm having a transversely extending front end to traverse the plane of the chair wheel and confront the tire of the wheel;
   - a releasable clamping jaw on the front end of the arm and facing rearwardly to embrace the frame of the wheelchair; and
   - articulated means in the arm permitting the front end of the arm and the clamping jaw to move in a transverse direction to swing away from the wheelchair frame and out of the way of the wheel of the chair.

2. The wheelchair retaining device according to claim 1 and the arm being extendible and retractable and having locking means to secure the arm in any of a plurality of extended positions and against extension of the arm.

3. The wheelchair retaining device according to claim 1 and the arm being articulated adjacent the rear end thereof to permit the arm to swing upwardly to an out of the way position.

4. The wheelchair retaining device according to claim 1 and the arm having sleeve and insert telescoping portions to effect extension and retraction of the arm, the insert portion having a plurality of regularly spaced and aligned lugs projecting from one side thereof and defining transversely oriented slots along said one side, an adjacent side of the insert portion being free of such lugs, the sleeve portion having a transverse key at said one side of the insert portion and received in one of said slots to confront a lug and prevent such extension and retraction, one of said sleeve and insert portions being rotatable about an axis extending longitudinally of the arm to separate the key from the slot and permit telescopic movement of the sleeve and insert portions.

5. A wheelchair retaining device according to claim 1 and the attachment means including a horizontally oriented rail and slide to permit transverse relocating of the arm relative to the wheelchair.

6. A wheelchair retaining device according to claim 5 and the arm being extensible and retractable and having quick release locking means to secure the arm against extension.

7. A wheelchair retaining device according to claim 1 and the articulated means including adjacent telescoping portions of the arm, said telescoping portions being rotatable relative to each other about an axis extending longitudinally of the arm.

8. A wheelchair retaining device according to claim 1 and the articulated means defining an axis of rotation of said front end, the axis extending longitudinally of the rear end of the arm.

9. A wheelchair retaining device according to claim 1 and the clamping jaw being slidable longitudinally along the front end of the arm, and means for extending and retracting the clamping jaw and securing the clamping jaw in retracted position.

10. A wheelchair retaining device according to claim 1 and the attachment means including an upright pedestal having support means for detachable affixation to the floor of such a vehicle and mounting the rear end of the arm spaced well above the support means.

11. A wheelchair retaining device according to claim 1 and the arm having telescoping portions respectively provided with transversely oriented interfitting slot and key parts, one of which is rotatable relative to the other about an axis extending longitudinally of the arm to effect such interfitting and disengagement to allow telescoping movement of such portions.

12. A wheelchair retaining device for use in a passenger carrying vehicle, comprising:

a substantially horizontal rigid rail to be attached to a rigid part of the vehicle;

and a pair of elongate and generally horizontally extending arms to receive such a wheelchair therebetween and to extend generally transversely outwardly from the rail and horizontally alongside of the wheelchair from back to front, the arms having attachment means on the rear ends thereof and secured to the rail at any of a plurality of locations along the length of the rail to locate the arms in closely spaced relation to the wheelchair and to accommodate wheelchairs of various sizes between the arms, the arms also having front ends with clamping jaws thereon to releasably embrace the frame of the wheelchair, and said arms being extendible and retractable and having locking means to lock the arms against undesired extension thereof for positioning the wheelchair.

13. The wheelchair retaining device according to claim 12 and the rail having a pair of support pedestals spaced from each other along the length of the rail, a pair of mounting tracks to be affixed to the vehicle floor beneath each of such said pedestals, each track and a respective pedestal having interfitting and detachable sockets and insert means removably retaining the pedestal in fixed position on the track.

14. A wheelchair retaining device according to claim 12 and each of the arms having sleeve and insert telescoping portions to vary the length thereof, and insert portion being rotatable in the sleeve portion to provide the tilting of the front ends and clamping jaws to clear the chair frame, the sleeve portion having a stationary locking keeper extending transversely of and spaced from the rotation axis, the keeper being in close proximity with the rotatable insert portion, the insert portion having a flat side confronting the keeper and slidable therealong to accommodate changing the length of the arm, the insert portion also having another side with a plurality of spaced lugs projecting therefrom and defining transverse slots therebetween to receive the locking keeper and prevent extension and retraction of the arm while the obliquely extending forward end of the arm extends generally horizontally inwardly toward the wheelchair frame.

15. A wheelchair retaining device according to claim 12 and the arms having hinged connections to the attachment means, the rear ends of the arms bearing endwise against the rail, and the swing axes of the hinged connections being disposed above the arms and extending transversely thereof.

16. A wheelchair retaining device according to claim 12 and said attachment means for each of the arms comprising a slide on the rail and movable therealong.

17. The wheelchair retaining device according to claim 12 and the extendible arm having telescoping tube and insert parts, the locking means including transversely oriented and abutting lugs and keepers on the tube and insert parts and positively preventing extension of the arms.

18. The wheelchair retaining device according to claim 12, and the rear ends of the arms being hingedly connected to the attachment means facilitating upward swinging of the arms to an out of the way position.

19. The wheelchair retaining device according to claim 12, and the rail having means attachable to an upright wall of the vehicle body.

20. The wheelchair retaining device according to claim 12, and the clamping jaws being movably mounted for fore and aft movement on the front ends of the arms, and releasable locking means retaining the jaws in rearwardly shifted position to lock against the wheelchair frame.

21. The wheelchair retaining device according to claim 20 and said releasable locking means including a swinging linkage having an over-center position to prevent swinging of the linkage and prevent forward movement of the clamping jaws against the resilient pressure generated by the wheelchair tires bearing against the rail.

22. The wheelchair retaining device according to claim 12 and the arms being articulated to accommodate outward swinging of the clamping jaws to clear the frame of the wheelchair.

23. The wheelchair retaining device according to claim 22 and the articulated arms having front and rear portions rotatable with respect to each other about axes extending generally longitudinally of the arm.

24. The wheelchair retaining device according to claim 23 and the front ends of the arms with the clamping jaws thereon extending obliquely inwardly and convergently relative to each other to allow the clamping jaws to engage rigid frame portions of the wheelchair while accommodating other appurtenances such as wheels.

25. A wheelchair retaining device for use in bus type vehicles, comprising clamping means for releasable attachment to the frame of a wheelchair including an elongate arm having a rear end with a movable slide thereon and a horizontal slide rail means to be affixed to a rigid part of the vehicle and slidably carry the slide and arm thereon in a direction transversely of the arm, and the arm also having a front end with a rearwardly facing clamping jaw to embrace the frame of the wheelchair and retain the chair against such rigid part, and the arm having locking and releasable extensible and retractable telescoping means to vary the clamping location of the jaw relative to said rear end.

26. A wheelchair retaining device for use in a passenger carrying vehicle, comprising an elongate rail adapted to be attached to a rigid part of the vehicle in spaced relation above the floor thereof to confront and act as a bumper against which the tires of the wheelchair wheel bear, the rail having open and unobstructed ends;

a pair of elongate arms extending horizontally from and transversely of the rail to receive a wheelchair therebetween and to lie alongside the wheelchair to extend from back to front thereof, each of the arms having a slide on the rear end thereof and slidably mounted on the rail for movement to various positions along the rail, said slides being slidably removable from the ends of the rail, each of the arms having a hinged connection to the respective slide to accommodate upward swinging of the arm to an out of the way position, the front end of each of the arms having a clamping jaw thereon to embrace and retain the frame of the wheelchair, the clamping jaw being slidable forwardly and rearwardly on the front end of the arm, each of the arms having a swinging linkage interconnecting the arm and the slidable clamping jaw for moving the clamping jaw forwardly and rearwardly on the arm, the swinging linkage having multiple swinging parts swinging to an over-center position relative to each other as the clamping jaw is moved rearwardly to lock the clamping jaw against undesired forward movement as the wheelchair is embraced and moved rearwardly firmly against the rail, and each of the arms also having sleeve and insert telescoping portions rotatable with respect to each other to effect extension and retraction of the arm and to permit tilting of the clamping jaw transversely away from the wheelchair, said sleeve and insert telescoping portions of each arm having cooperating locking means to prevent undesired extension of the arm, said locking means permitting, without obstruction, relative rotation of such portions to release the locking means and to swing the clamping jaw clear of the frame of the wheelchair and the locking means also including interengaging keepers and lugs on the opposite portions for bearing against each other and retaining the arm against extension.

* * * * *